(12) United States Patent
Igarashi et al.

(10) Patent No.: US 10,569,338 B2
(45) Date of Patent: Feb. 25, 2020

(54) COMPOSITE SINTERED BODY CUTTING TOOL AND SURFACE COATED COMPOSITE SINTERED BODY CUTTING TOOL

(71) Applicant: MITSUBISHI MATERIALS CORPORATION, Tokyo (JP)

(72) Inventors: Makoto Igarashi, Naka (JP); Akihiro Murakami, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 253 days.

(21) Appl. No.: 15/538,562

(22) PCT Filed: Dec. 24, 2015

(86) PCT No.: PCT/JP2015/086053
§ 371 (c)(1),
(2) Date: Jun. 21, 2017

(87) PCT Pub. No.: WO2016/104620
PCT Pub. Date: Jun. 30, 2016

(65) Prior Publication Data
US 2017/0341156 A1    Nov. 30, 2017

(30) Foreign Application Priority Data

Dec. 25, 2014 (JP) ................... 2014-263582
Dec. 23, 2015 (JP) ................... 2015-250733

(51) Int. Cl.
*B23B 27/14* (2006.01)
*B22F 7/00* (2006.01)
(Continued)

(52) U.S. Cl.
CPC .............. *B23B 27/148* (2013.01); *B22F 7/00* (2013.01); *B22F 7/06* (2013.01); *C22C 29/005* (2013.01);
(Continued)

(58) Field of Classification Search
USPC ........... 428/216, 697, 698, 699; 51/307, 309
See application file for complete search history.

(56) References Cited

U.S. PATENT DOCUMENTS

| 6,506,226 | B1 | 1/2003 | Chen et al. | |
| 7,544,410 | B2 * | 6/2009 | Lengauer | B22F 3/101 |
| | | | | 428/216 |
| 2005/0115742 | A1 | 6/2005 | Daub et al. | |

FOREIGN PATENT DOCUMENTS

| CN | 102196874 A | 9/2011 |
| CN | 104044308 A | 9/2014 |

(Continued)

OTHER PUBLICATIONS

International Search Report dated Jan. 26, 2016 for the corresponding PCT Application No. PCT/JP2015/086053.
(Continued)

*Primary Examiner* — Archene A Turner
(74) *Attorney, Agent, or Firm* — Leason Ellis LLP (57) ABSTRACT

A composite sintered body cutting tool is made of a composite sintered body comprising a TiCN-based cermet layer; and a WC-based cemented carbide layer. The angle between the rake face and the flank face of the cutting tool is 90°. The rake face including a cutting edge of the cutting tool is constituted from the WC-based cemented carbide layer, in which 4 to 17 mass % of an iron group metal component and 75 mass % or more of W are included; and a major hard phase component is WC. The thickness of the WC-based cemented carbide layer is 0.05 to 0.3 times the thickness of the composite sintered body. The TiCN-based cermet layer is constituted from a single layer of a TiCN-based cermet layer, including at least, 4 to 25 mass % of an iron group metal component, less than 15 mass % of W, 2 to 15 mass % of Mo, 2 to 10 mass % of Nb and 0.2 to 2 mass % of Cr in a case where contents of the constituting components of
(Continued)

the cermet layer are expressed as contents of metal components, and satisfy the Co content relative to the total content of Co and Ni of 0.5 to 0.8 with respect to Co and Ni of the iron group metal component in a mass ratio. When the height profile from the upper end to the lower end of the flank face is measured in the plane, which passes the center of the rake face of the cutting tool and is perpendicular to both of the rake face and the flank face, as the line, which passes the ridge line where the rake face and the flank face intersect and perpendicular to the rake face, being the reference line, the maximum elevation difference value of the height profile is in a ratio of 0.01 or less with respect to the thickness of the composite sintered body from the front surface of the rake face to a rear surface.

6 Claims, 2 Drawing Sheets

(51) Int. Cl.
  *B22F 7/06* (2006.01)
  *C22C 29/04* (2006.01)
  *C22C 29/00* (2006.01)
  *B22F 5/00* (2006.01)

(52) U.S. Cl.
  CPC ........ *C22C 29/04* (2013.01); *B22F 2005/001* (2013.01); *B22F 2998/10* (2013.01); *B23B 2222/16* (2013.01); *B23B 2222/28* (2013.01); *B23B 2228/36* (2013.01)

(56) References Cited

FOREIGN PATENT DOCUMENTS

| | | | |
|---|---|---|---|
| DE | 19922057 | A | 11/2000 |
| JP | 2893887 | B | 5/1999 |
| JP | 2005-521790 | A | 7/2005 |
| JP | 3938349 | B | 6/2007 |
| JP | 2012-030293 | * | 2/2012 |
| JP | 5185032 | B | 4/2013 |
| JP | 5297381 | B | 9/2013 |
| JP | 5413047 | B | 2/2014 |
| JP | 2014-172157 | A | 9/2014 |

OTHER PUBLICATIONS

Extended European Search Report dated Jul. 19, 2018 for the corresponding European Patent Application No. 15873188.5.
Office Action dated Aug. 20, 2018 for the corresponding Chinese Patent Application No. 201580070215.3.

* cited by examiner

COMPOSITE SINTERED BODY CUTTING TOOL AND SURFACE COATED COMPOSITE SINTERED BODY CUTTING TOOL

CROSS-REFERENCE TO RELATED PATENT APPLICATIONS

This application is a U.S. National Phase application under 35 U.S.C. § 371 of International Patent Application No. PCT/JP2015/086053 filed on Dec. 24, 2015 and claims the benefit of Japanese Patent Applications No. 2014-263582, filed Dec. 25, 2014, and No. 2015-250733, filed Dec. 23, 2015, all of which are incorporated herein by reference in their entirety. The International application was published in Japanese on Jun. 30, 2016 as International Publication No. WO/2016/104620 under PCT Article 21(2).

FIELD OF THE INVENTION

The present invention relates to a cutting tool made of a composite sintered body of a TiCN-based cermet and a WC-based cemented carbide. Particularly, it relates to a cutting tool, in which reduction of the usage of tungsten which is a rare metal is intended, having less amount of deformation of the sintered material during sintering and excellent thermal crack resistance.

BACKGROUND OF THE INVENTION

The WC-based cemented carbide has been used broadly as tools for cutting of steel and cast iron. Conventionally, various proposals have been made in order to reduce the usage of tungsten, which is a rare metal, and to obtain an intended cutting performance.

For example, a cutting tool made of a composite sintered body, in which the impact resistance and the finished surface gloss of the work material are improved by setting h2/h1 to 0.002-0.02, when h1 is the maximum thickness of the base material in the lamination direction; and h2 is the maximum thickness of the cemented carbide layer of the cutting edge part in the lamination direction, in the cutting tool made of the base material, in which: the cemented carbide layer; and the cermet layer including 15-65 mass % or less of WC and W in total and 80 mass % or more of the iron group metal in the binder phase are Co, are laminated, is proposed in Patent Literature 1 (Japanese Patent (Granted) Publication No. 5185032 (B)).

In addition, a cutting tool made of a composite sintered body, in which the bondability between the cemented carbide layer and the cermet layer is improved; and deformation of the base material after sintering is suppressed by: forming the convexo-concave part having the maximum depth of 50 µm to 500 µm in the boundary between the cemented carbide layer and the cermet layer; and setting h2/h1 to more than 0.02 and 0.4 or less when h1 is the maximum thickness of the base material in the lamination direction; and h2 is the maximum thickness of the cemented carbide layer provided on the rake face side in the lamination direction, in the cutting tool made of the base material, in which: the cemented carbide layer; and the cermet layer including 15-65 mass % or less of WC and W in total and 80 mass % or more of the iron group metal in the binder phase are Co, are laminated, is proposed in Patent Literature 2 (Japanese Patent (Granted) Publication No. 5297381 (B)), for example.

In addition, it is proposed that: the bondability between the cemented carbide and the cermet can be improved; and the wear resistance and the toughness of a cutting tool made of a composite sintered body can be improved in Patent Literature 3 (Japanese Patent (Granted) Publication No. 5413047 (B)), for example, by: improving the; and suppressing deformation generated in sintering, by: setting the convexo-concave state in a specific range in the boundary between the cemented carbide layer and the cermet layer; or adjusting the amounts of binder phases of both layers in specific ranges in producing a tool body by: forming a pressed compact from each of the cemented carbide powder and the cermet powder; laminating these pressed compacts; and sintering in which they are held at 1300-1500° C. for 0.5-3 hours in the vacuum atmosphere.

Problems to be Solved by the Present Invention

In the cutting tools made of the composite sintered body such as ones described in Japanese Patent (Granted) Publication No. 5185032 (B) and Japanese Patent (Granted) Publication No. 5297381 (B), reduction of the usage of tungsten could be achieved in a certain extent. However, 15 mass % or more of W and WC is included in the cermet. Thus, reduction of the usage of tungsten is not sufficient. In addition, in the case where such cutting tools are used in wet intermittent cutting, not only the strength and the toughness but also the thermal crack resistance is insufficient. Thus, there is a technical problem that they are damaged easily due to the abnormal damage such as chipping, fracture and the like.

In addition, in the composite sintered body made of the cemented carbide and the cermet described in Japanese Patent (Granted) Publication No. 5413047 (B), there is a need for not only forming the convexo-concave in the boundary between the cemented carbide layer and the cermet layer but also matching the shrinkage properties between dissimilar materials in sintering of the pressed body in order to obtain a composite sintered body with less deformation in sintering. Because of this, the reduction of the usage of tungsten is restricted to about 30% in the cutting tool produced from the composite sintered body; and it is not satisfactory from the viewpoint of resource saving. In addition, under the cutting condition where the cutting tool is exposed to harsh thermal history such as wet intermittent cutting and the like, it is possible that the cemented carbide on the cutting edge would be damaged due to development of a crack or the like. Thus, it cannot be said that it is reliable.

The present invention is made under the circumstances described above. The purpose of the present invention is: to intend to reduce the usage of tungsten, which is a rare metal; and to provide a cutting tool with the effect of suppressing crack development and an excellent abnormal damage resistance even in the case where the cutting tool is used in the intermittent cutting where intermittent and impacting high load is exerted on the cutting edge in a cutting tool having a tool body made of a composite sintered body of the TiCN-based cermet and the WC-based cemented carbide.

SUMMARY OF THE INVENTION

Means to Solving the Problems

From the above-described viewpoints, the inventors of the present invention intended to reduce the usage of tungsten in a composite sintered body cutting tool having a tool body made of a composite sintered body of the TiCN-based cermet and the WC-based cemented carbide; and conducted extensive studies about the cutting tool with excellent effect of suppressing propagation and development of the crack even in the case where the cutting tool is used in the intermittent cutting where intermittent and impacting high load is exerted on the cutting edge, thereby abnormal damages such as chipping, fracture, peeling, and the like are not caused for a long-term usage. As a result, they found findings described below.

When the rake face including the cutting edge of the tool is formed by the WC-based cemented carbide layer in the composite sintered body cutting tool of the TiCN-based cermet and the WC-based cemented carbide, compressive stress is formed due to thermal expansion coefficient difference in sintering of the composite sintered body. Because of this, the intermittent cutting performance of the tool is improved. However, deformation behavior of the TiCN-based cermet during sintering is different between in the boundary part between the TiCN-based cermet and the WC-based cemented carbide layer and in the center part of the TiCN-based cermet. Since there is a large amount of contraction in the center part of the cermet compared to in the boundary part with the WC-based cemented carbide layer, a large deformation (convex) is formed in the center part of the cermet of the composite sintered body.

However, the inventors of the present invention found that: the deformation in the center part of the cermet can be reduced by adjusting the component composition of the TiCN-based cermet used; reduction of the finished surface accuracy of the work material can be prevented by this; the thermal crack resistance of the cutting tool can be improved; and the usage of tungsten which is a rare metal can be reduced.

As a result, it is found that propagation and development of the crack are prevented even in wet intermittent cutting of alloy steel where intermittent and impacting high load is exerted on the cutting edge in the cutting tool with the tool body of the above-described composite sintered body; and the cutting tool exhibits excellent abnormal damage resistance and wear resistance for a long-term usage.

The present invention is made under the circumstances described above and has aspects described below.

(1) A composite sintered body cutting tool made of a composite sintered body of: a TiCN-based cermet layer; and a WC-based cemented carbide layer, wherein (a) an angle between a rake face and a flank face of the cutting tool is 90°, (b) the rake face including a cutting edge of the cutting tool is constituted from the WC-based cemented carbide layer, in which 4 to 17 mass % of an iron group metal component and 75 mass % or more of W are included; and a major hard phase component is WC, (c) a thickness of the WC-based cemented carbide layer is 0.05 to 0.3 times of a thickness of the composite sintered body, (d) the TiCN-based cermet layer is constituted from a single layer of a TiCN-based cermet layer, including at least, 4 to 25 mass % of an iron group metal component, less than 15 mass % of W, 2 to 15 mass % of Mo, 2 to 10 mass % of Nb and 0.2 to 2 mass % of Cr in a case where contents of constituting components of the cermet layer are expressed as contents of metal components, and satisfies a Co content relative to a total content of Co and Ni of 0.5 to 0.8 with respect to Co and Ni of the iron group metal component in a mass ratio, and (e) when a height profile from an upper end to a lower end of the flank face is measured in a plane, which passes a center of the rake face of the cutting tool and is perpendicular to both of the rake face and the flank face, as a line, which passes a ridge line where the rake face and the flank face intersect and perpendicular to the rake face, being a reference line, a maximum elevation difference value of the height profile is in a ratio of 0.01 or less with respect to a thickness of the composite sintered body from a front surface of the rake face to a rear surface.

(2) The composite sintered body cutting tool according to the above-described (1), wherein a planar shape of the rake face is in a polygonal shape or a circular shape.

(3) The composite sintered body cutting tool according to the above-described (1) or (2), wherein the WC-based cemented carbide layer constituting the rake face of the composite sintered body cutting tool is formed on: a front surface of the TiCN-based cermet layer; or a front surface and a rear surface of the TiCN-based cermet layer.

(4) A surface coated composite sintered body cutting tool including:

the composite sintered body cutting tool according to any one of the above-described (1) to (3); and a hard coating layer formed on the front surface of the WC-based cemented carbide layer constituting at least the rake face of the composite sintered body cutting tool comprising the TiCN-based cermet layer and the WC-based cemented carbide layer.

Effects of the Invention

The composite sintered body cutting tool, which is an aspect of the present invention, is a negative insert made of a composite sintered body of the TiCN-based cermet and the WC-based cemented carbide (hereinafter, refereed as "the composite sintered body cutting tool of the present invention" or "the cutting tool of the present invention"). It has the effect of: suppressing propagation and development of the crack; and exhibiting excellent abnormal damage resistance and wear resistance for a long-term usage without reducing the thermal crack resistance in the wet intermittent cutting of alloy steel or the like where the intermittent and impacting high load and the thermal load are exerted on the cutting edge even if the usage of tungsten is reduced, by: optimizing the range of the component composition of the TiCN-based cermet and the WC-based cemented carbide; optimizing the thickness ratio of the WC-based cemented carbide layer constituting the rake face including the cutting edge; and suppressing deformation/shrinkage of the center part of the TiCN-based cermet layer.

DETAILED DESCRIPTION OF THE INVENTION

Embodiments of the present invention are explained below in reference to the drawings.

Figure 1A:
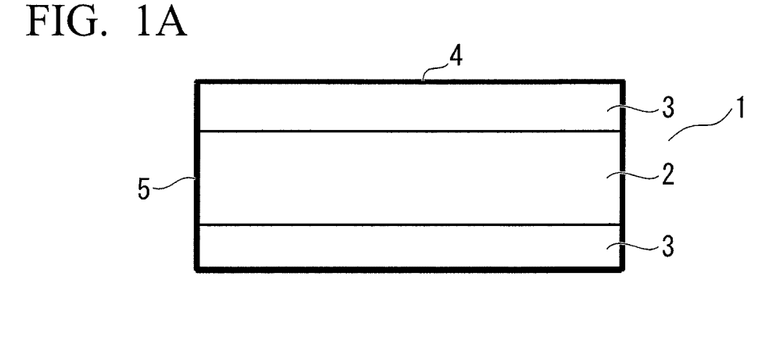
FIG. 1A shows a schematic diagram of the composite sintered body cutting tool of the present invention. It shows a side view of an example of the composite sintered body cutting tool of the present invention.
Figure 1B:
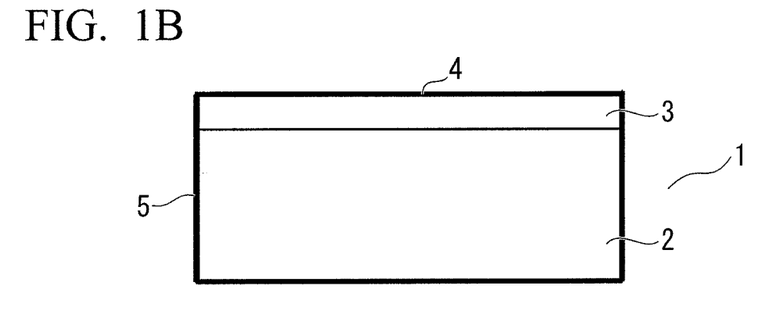
FIG. 1B shows a schematic diagram of the composite sintered body cutting tool of the present invention. It shows a side view of other example of the composite sintered body cutting tool of the present invention.
Figure 1C:
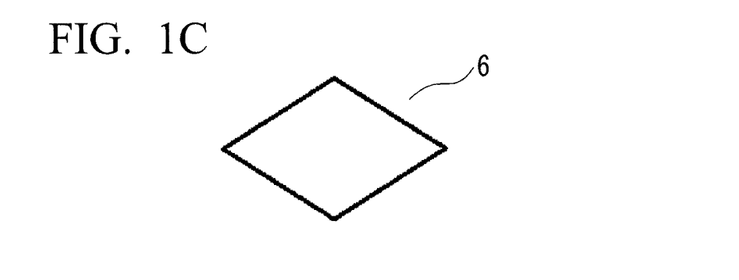
FIG. 1C shows an example of the planar shape of the rake face (polygonal shape) of the composite sintered body cutting tool of the present invention.
Figure 1D:
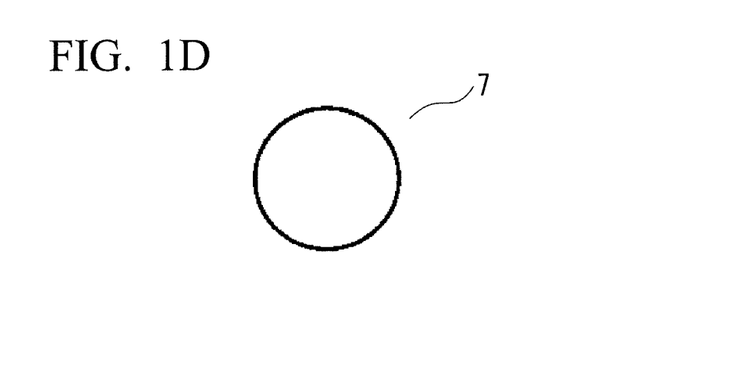
FIG. 1D shows other example of the planar shape of the rake face (circular shape) of the composite sintered body cutting tool of the present invention.

FIGS. 1A-1D show schematic diagrams of the composite sintered body cutting tool 1 of the present invention. FIG. 1A shows a side view of an example of the composite sintered body cutting tool 1 of the present invention. FIG. 1B shows a side view of other example of the composite sintered body cutting tool 1 of the present invention. FIG. 1C shows an example of the planar shape of the rake face 6 (polygonal shape) of the composite sintered body cutting tool 1 of the present invention. FIG. 1D shows other example of the planar shape of the rake face 7 (circular shape) of the composite sintered body cutting tool 1 of the present invention.

As shown in FIGS. 1A and 1B, the entire tool body is not constituted from WC-based cemented carbide. Instead, it has the structure, in which the TiCN-based cermet layer 2 is provided as the base; and the WC-based cemented carbide layers 3 are provided on the rake faces 4 including the cutting edges in the cutting tool 1 of the present invention. Particularly, in the structure shown in FIG. 1A, the rake face 4 made of the WC-based cemented carbide layer 3 is formed on the front and rear surfaces of the TiCN-based cermet layer 2. Therefore, when damages and wears amount become severe on one of the rake faces, the rake face 4 including the new cutting edge can be brought into sight by inverting the front and rear surfaces of the tool; and cutting can be continued. It is not essential to form the rake faces 4 on both of the front and rear surfaces of the TiCN-based cermet layer 2 in the cutting tool 1 of the present invention. It is only needed to form the rake face 4 on at least one of the front and rear surfaces.

In addition, when the planar shape of the rake face 4 is in the polygonal shape as shown in FIG. 1C (a rectangular shape or a diamond shape in FIG. 2C), each vertex of corners can be used as a cutting edge in the cutting tool 1 of the present invention. In addition, when the planar shape of the rake face 4 is in the circular shape as shown in FIG. 1D (including an elliptical shape), any location on the circle can be used as a cutting edge.

The flank face 5 is the side surface of the cutting tool, which is orthogonal to the rake face 4 at 90°. The cutting edge of the cutting tool is formed on the ridge line where the flank face 5 and the rake face 4 intersect.

Figure 2A:
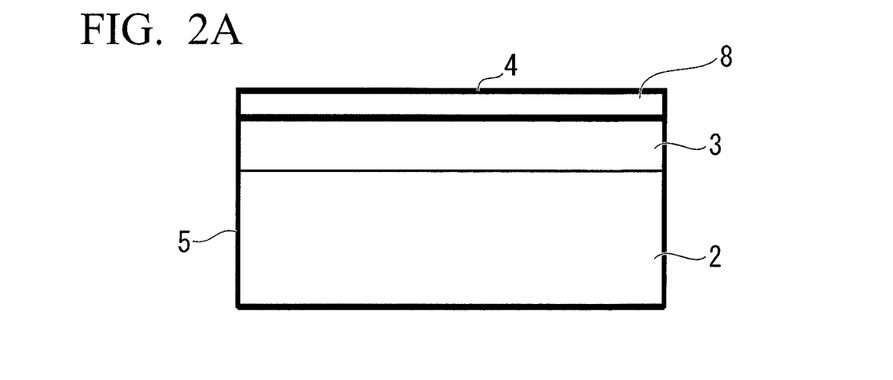
FIG. 2A shows a schematic diagram of the surface coated composite sintered body cutting tool in which the hard coating layer is deposited on the surface of the composite sintered body cutting tool of the present invention. It shows a side view of an example of the surface coated sintered body cutting tool of the present invention.
Figure 2B:
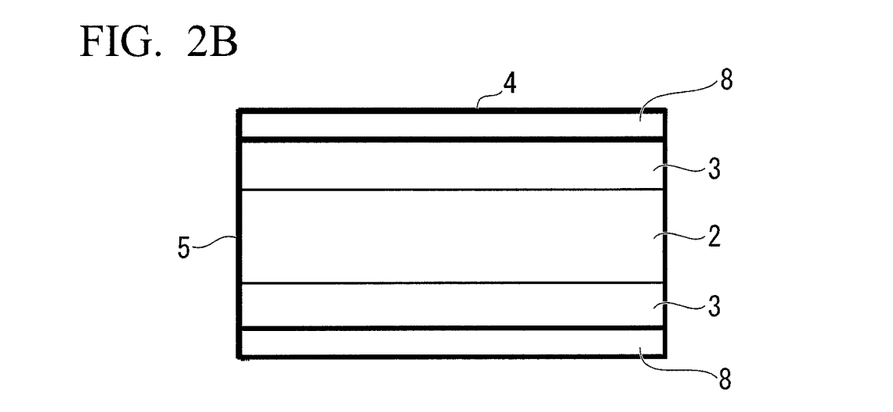
FIG. 2B shows a schematic diagram of the surface coated composite sintered body cutting tool in which the hard coating layer is deposited on the surface of the composite sintered body cutting tool of the present invention. It shows a side view of other example of the surface coated sintered body cutting tool of the present invention.

FIGS. 2A and 2B show schematic diagrams of the surface coated composite sintered body cutting tool in which the hard coating layer 8 is deposited on the surface of the composite sintered body cutting tool 1 of the present invention. FIG. 2A shows a side view of an example of the surface coated sintered body cutting tool 1 of the present invention.

FIG. 2B shows a side view of other example of the surface coated sintered body cutting tool 1 of the present invention.

As shown in FIGS. 2A and 2B, the cutting tool of the present invention can be used as a surface coated sintered body cutting tool by depositing the hard coating layer 8 on the surface of the cutting tool. FIG. 2A shows a cutting tool in which the race face 4 made of the WC-based cemented carbide is formed only on one surface of the TiCN-based cermet and the hard coating layer 8 is deposited on the rake face 4.

Figure 3:
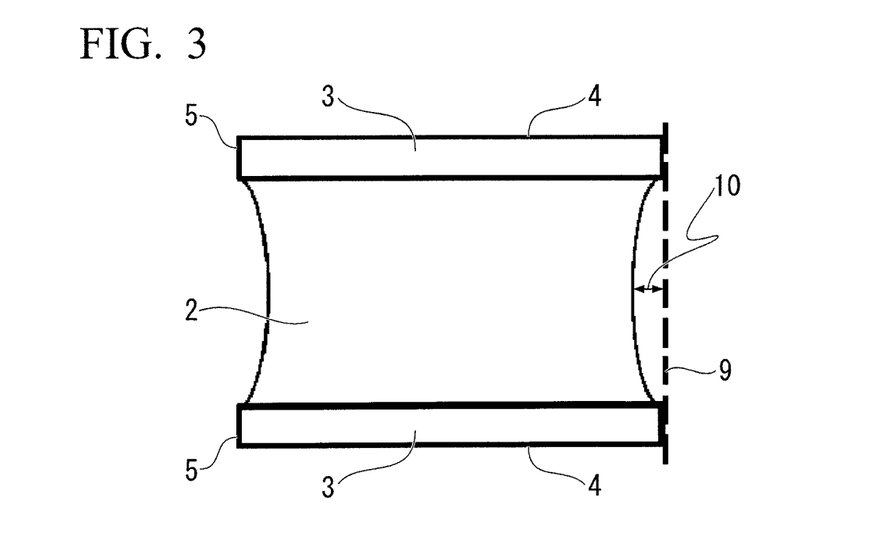
FIG. 3 shows a schematic diagram of the height profile of the flank face and the maximum elevation difference defined in the present invention.

FIG. 3 shows a schematic diagram of the height profile of the flank face and the maximum elevation difference 10 defined in the cutting tool of the present invention.

The composite sintered body cutting tool of the present invention (hereinafter, "the composite sintered body cutting tool" is referred as "the cutting tool", occasionally) and the surface coated composite sintered body cutting tool of the present invention (hereinafter, "the surface coated composite sintered body cutting tool" is referred as "the coated tool", occasionally) can be approximately produced by the production method described below.

First, the TiCN-based cermet powder in a predetermined composition and the WC-based cemented carbide powder in a predetermined composition are prepared. Then, by pressing these powders, the composite green compact, in which the TiCN-based cermet and the WC-based cemented carbide are laminated, is produced. Then, the composite sintered body is produced by sintering the composite green compact in the condition at 1420° C. for 1 hr in the nitrogen atmosphere of 0.1 kPa, for example. Then, the composite sintered body cutting tool of the present invention is produced by machining the obtained composite sintered body into a predetermined shape.

In addition, the surface coated composite sintered body cutting tool of the present invention is produced by depositing the hard coating layer, such as the Ti compound layer; the Ti and Al complex nitride layer; the $Al_2O_3$ layer; and the like, as a single or multi laminated films on the surface of the above-produced composite sintered body cutting tool of the present invention on the WC-based cemented carbide side, at least by the physical vapor deposition method, the chemical vapor deposition method, or the like.

Component Composition of the TiCN-Based Cermet Layer:

The TiCN-based cermet layer 2 used in the present invention is a cermet in which TiCN is the major hard component; and 4 to 25 mass % of the iron group metal (for example, Co, Ni, and Fe) is the major binding phase component. When contents of other contained components are converted as an element over the total metal components, the W content is less than 15 mass %, the Mo content is 2 to 15 mass %, the Nb content is 2 to 10 mass %, and the Cr content is 0.2 to 2 mass %. In addition, in terms of Co and Ni among the iron group metal components, the ratio of the Co content with respect to the total content of Co and Ni is 0.5 to 0.8.

W:

The W content is set to less than 15 mass % in the present invention, since W is the component element, the content of which is required to be reduced as intended in the present invention, although sintering as the composite body becomes easier with higher W content in the TiCN-based cermet because the property of the TiCN-based cermet gets closer to that of the WC-based cemented carbide.

Although, it is not particularly limiting, it is preferable that the W content is 0 mass % to 12 mass %. More preferably, it is 0 mass % to 8 mass %.

Mo:

Mo is the component element having an action of improving sinterability since it improves the wettability of the hard phase and the binder phase in the TiCN-based cermet. If the Mo content were less than 2 mass %, the improvement effect of the wettability would be insufficient. On the other hand, if the Mo content exceeded 15 mass %, Mo would be melted in the hard phase for the strength and the toughness to be reduced. Therefore, the Mo content is set to 2 to 15 mass %.

Although, it is not particularly limiting, it is preferable that the Mo content is 3 mass % to 14 mass %. More preferably, it is 7 mass % to 10 mass %.

Nb:

Nb has the effect of improving the high temperature oxidation resistance of the TiCN-based cermet. If the Nb content were less than 2 mass % or exceeded 10 mass %, the effect of improving the high temperature oxidation resistance would be reduced. Therefore, the Nb content is set to 2 to 10 mass %.

Although, it is not particularly limiting, it is preferable that the Nb content is 3 mass % to 9 mass %. More preferably, it is 4 mass % to 8 mass %.

Cr:

Cr has the effect in which the sintering temperature of the TiCN-based cermet becomes closer to that of the WC-based cemented carbide. If the Cr content were less than 0.2 mass %, the effect would be insufficient. On the other hand, if the Cr content exceeded 2 mass %, the free phase of $Cr_3C_2$ would be precipitated for the toughness of the sintered body to be reduced. Therefore, the Cr content is set to 0.2 to 2 mass %.

Although, it is not particularly limiting, it is preferable that the Cr content is 0.5 mass % to 1.7 mass %. More preferably, it is 0.8 mass % to 1.4 mass %.

Co:

Co is an iron group metal component and a binding phase component in the TiCN-based cermet. It is necessary for the ratio of the Co content with respect to the total content of Co and Ni (Co/(Co+Ni)) to be in the range of 0.5 to 0.8 (in mass ratio) in relation to Ni, which is another iron group metal component. If the ratio of the Co content with respect to the total content of Co and Ni (Co/(Co+Ni)) were less than 0.5, the Ni component in the TiCN-based cermet layer 2 would diffuse in the WC-based cemented carbide layer 3 for the high temperature hardness of the WC-based cemented carbide layer 3 to be reduced during sintering the composite green compact of the TiCN-based cermet and the WC-based cemented carbide. On the other hand, if the ratio of the Co content with respect to the total content of Co and Ni (Co/(Co+Ni)) exceeded 0.8, the toughness of the TiCN-based cermet layer 2 would be reduced; and it would possibly lead to damaging the composite sintered body.

Therefore, in terms of Co and Ni, which are the components included in the TiCN-based cermet layer 2, the ratio of the Co content with respect to the total content of Co and Ni (Co/(Co+Ni)) is set to the range of 0.5 to 0.8 (in mass ratio).

Although, it is not particularly limiting, it is preferable that the ratio of the Co content with respect to the total content of Co and Ni is 0.6 to 0.7 in mass ratio.

Component Composition of the WC-Based Cemented Carbide:

The WC-based cemented carbide constituting the composite sintered body with the TiCN-based cermet is made of WC which is the major hard phase component; and the iron group metal (for example, Co, Ni and Fe) which is the major binding phase component. The binding phase component binds strongly to the hard phase component and has the action of improving the strength and the toughness of the tool body. If the content of the iron group component were less than 4 mass %, the intended effect of the action would be obtained. On the other hand, if the content of the iron group component exceeded 17 mass %, the wear resistance would not be reduced. Therefore, the total content of the iron group components (for example, Co, Fi and Fe), which are the binding phase component, is set to 4 to 17 mass %.

Although, it is not particularly limiting, it is preferable that the total content of the iron group components (for example, Co, Fi and Fe), which are the binding phase component, is set to 8 to 13 mass %.

WC, which is the major hard phase component, is the component securing the hardness of the tool body. If the W content in the WC-based cemented carbide were less than 75 mass %, the tool body does not exhibits the intended hardness; and the wear resistance would be reduced. Therefore, the W content in the WC-based cemented carbide is set to 75 mass % or more.

In addition, each component of Ti, Zr, Nb, Ta and Cr has the action of: increasing the hardness of the WC-based cemented carbide; and improving the wear resistance by forming carbide, nitride, carbonitride or the like. If the total content of these hard phase components exceeded 10 mass % (after being converted as the metal components), the toughness would be reduced. Thus, it is preferable that the total content of each component of Ti, Zr, Nb, Ta and Cr is set to 10 mass % or less.

Although, it is not particularly limiting, it is preferable that the total content of each component of Ti, Zr, Nb, Ta and Cr is set to 1 mass % to 5 mass %.

WC-Based Cemented Carbide Constituting the Rake Face Including the Cutting Edge:

Among the composite sintered body made of the TiCN-based cermet layer 2 and the WC-based cemented carbide layer 3, the TiCN-based cermet layer 2 becomes the tool body; and the WC-based cemented carbide layer 3 is formed on it as the rake face including the cutting edge, thereby the cutting tool 1 is constituted.

Also, the present invention, in which has an angle between the rake face 4 and the flank face 5 of the tool is 90°, belongs to the cutting tools called the negative inserts.

In the cutting tool 1 of the present invention, the thickness of the WC-based cemented carbide layer 3 as the rake face 4 including the cutting edge is set to the thickness of 0.05 to 0.3 times of the thickness of the composite sintered body. In the case where the rake face 4 is formed on both of the front and rear surfaces of the TiCN-based cermet layer 2, "the thickness of the WC-based cemented carbide layer 3 as the rake face 4" means the total thickness of the WC-based cemented carbide layers 3 on the front and rear surfaces.

This is because large load is exerted on the TiCN-based cermet layer with inferior toughness during cutting; and fracture becomes likely to occur in the case where the thickness of the WC-based cemented carbide layer is less than 0.05 times of the thickness of the composite sintered body. On the other hand, in the case where the thickness of the WC-based cemented carbide layer exceeds 0.3 times of the thickness of the composite sintered body, not only is lesser residual compressive stress placed on the WC-based cemented carbide layer 3 for the chipping resistance and the fracture resistance to be reduced, but also it contradicts with the purpose of the present invention, which is to reduce the usage of W.

Therefore, the thickness of the WC-based cemented carbide layer 3 is set to the thickness of 0.05 to 0.3 times of the thickness of the composite sintered body in the present invention.

Maximum Elevation Difference of the Height Profile from the Reference Plane:

The component composition of the TiCN-based cermet layer 2; the component composition of the WC-based cemented carbide layer 3; and the thickness of the WC-based cemented carbide layer 3 constituting the rake face 4, are as described above in the cutting tool 1 of the present invention. In addition, it is necessary for the maximum elevation difference 10 of the height profile from the reference line 9 to be kept 1% or less of the thickness of the tool when the height profile of the flank face is measured in the present invention in order to: reduce wear of the flank face of the cutting tool made of the composite sintered body of the TiCN-based cermet layer 2 and the WC-based cemented carbide layer 3 in intermittent cutting where intermittent and impacting high load is exerted on the cutting edge; and prevent reduction of the finished surface accuracy of the work material.

As shown in FIG. 3, when the height profile from the upper end to the lower end of the flank face 5 is measured in the plane, which passes the center of the rake face 4 of the cutting tool 1 and is perpendicular to both of the rake face 4 and the flank face 5, as the line, which passes the ridge line where the rake face 4 and the flank face 5 intersect and perpendicular to the rake face 4, being the reference line 9, the maximum elevation difference value of the height profile is needed to be in the ratio of 0.01 or less with respect to the thickness of the composite sintered body from the front surface of the rake face to the rear surface.

This is because, if the ratio of the maximum elevation difference exceeded 0.01, although the thermal crack resistance would be improved due to a higher value of the residual compressive stress in the rake face 4 of the cutting tool, the wear resistance on the flank face would be deteriorated; and the finished surface accuracy of the work material would be reduced in return.

In regard to the variation of the height profile on the flank face, the WC-based cemented carbide and the TiCN-based cermet are started to be shrunk with densification of the WC-based cemented carbide and the TiCN-based cermet during sintering the laminated TiCN-based cermet and WC-based cemented carbide for example in the temperature range of 1400 to 1440° C. The TiCN-based cermet in the boundary part between the WC-based cemented carbide layer 3 and the TiCN-based cermet layer 2 is densified thoroughly and is not likely to be deformed and/or shrunk further. However, the center part of the TiCN-based cermet layer 2 is shrunk further since deformation and/or shrinking are not inhibited strongly in the center part of the TiCN-based cermet layer 2. As a result, due to the difference in shrinkage behavior between the WC-based cemented carbide and the TiCN-based cermet, a large concave part is formed in the center part of the TiCN-based cermet layer 2 as shown in FIG. 3.

Hard Coating Layer:

The cutting tool 1 of the present invention can be used as a cutting tool as it is by having the WC-based cemented carbide of the composite sintered body be the rake face 4 including the cutting edge. However, cutting performance can be further improved by coating a Ti and Al complex nitride layer as the hard coating layer 8 on the surface of the WC-based cemented carbide constituting the rake face 4 including the cutting edge, for example, by the physical vapor deposition method, the chemical vapor deposition method, or the like.

As the hard coating layer 8, not only the Ti and Al complex nitride layer, but also various known hard coating layers, such as the Ti nitride layer, Ti carbide layer, Ti carbonitride layer, the Al and Cr complex nitride layer, the $Al_2O_3$ layer, and the like, can be coated as a single layer or laminated multiple layers thereof.

The present invention is explained specifically based on Examples below.

Example 1

In Example 1, a tool, in which the rake face made of the WC-based cemented carbide was formed only on one surface of the TiCN-based cermet, with the planar shape of a polygonal shape, is explained in Example 1.

(a) First, the WC-based cemented carbide raw material powder having the blending composition shown in Table 1 and the average grain size of 0.5 to 3 μm was prepared.

In addition, the TiCN-based cermet raw material powder having the blending composition shown in Table 2 and the average grain size of 0.5 to 3 μm was prepared.

The above-described WC-based cemented carbide raw material powder and the TiCN-based cermet material powder were laminate-pressed in the combinations shown in Table 3 with the material dies of the ISO insert shape SNMN120408; and the composite green compacts 1-6 were produced.

Then, the composite green compacts 1-6 were sintered to produce the composite sintered bodies 1-6.

The sintering condition was as described below in any one of them.

During heating the composite green bodies to the sintering temperature, the temperature was increased in the rising rate of 5° C./min from the room temperature to 1280° C.; any one of them was heated quickly in the rising rate of 30° C./min or more in the temperature range from 1280° C. to 1380° C. where the liquid phase appeared; any one of them was heated in the rising rate of 5° C./min from 1380° C. to 1420° C.; and they were cooled after being kept at the sintering temperature of 1420° C. for 1 hour in the nitrogen atmosphere of 0.1 kPa.

Next, the composite sintered body cutting tools 1-6 (hereinafter referred as tools 1-6 of the present invention), which had the planar shape of the rake face was in the polygonal shape, in the shape of SNMN120408, were produced by performing honing process of R=0.04 on the cutting edge as the WC-based cemented carbide being the rake face on the obtained composite sintered bodies 1-6.

The component compositions of the WC-based cemented carbide layer and the TiCN-based cermet layer were obtained by: performing compositional analysis on each location from the boundary between the WC-based cemented carbide layer and the TiCN-based cermet layer to the location 100 μm to the WC-based cemented carbide layer side or to the location 100 μm to the TiCN-based cermet layer side by using an electron probe microanalyzer; and obtaining the average values on 10 measurement locations on the cross sections parallel to the lamination direction of the WC-based cemented carbide layer and the TiCN-based cermet layer of the above-described tools 1-6 of the present invention.

These values are shown in Table 4.

In addition, thicknesses of the WC-based cemented carbide layer and the TiCN-based cermet layer of the tools 1-6 of the present invention were measured by observing with an optical microscopy.

These values are shown in Table 4.

Next, the hard coating layer made of the Ti and Al complex nitride (each of the Ti content and the Al content was 50 atomic %) was deposited on the surface of the WC-based cemented carbide by arc ion plating in the tools 4-6 of the present invention.

The layer thicknesses of deposited hard coating layers are shown in Table 4.

For comparison, the composite sintered bodies 1-6 of the comparative examples were produced by laminate-pressing the WC-based cemented carbide raw material powder in the blending composition shown in Table 1 and the TiCN-based cermet raw material powder in the blending composition shown in Table 2 in the combinations shown in Table 5 to produce the composite green compacts of the comparative example; and then by sintering these composite green compacts in the condition same as the above-described example.

In addition, the sintered bodies 7-9 of the comparative example (referred as the composite sintered bodies 7-9 of the comparative example, for convenience) made of only the WC-based cemented carbide were produced from only the WC-based cemented carbide raw material powder in the blending composition shown in Table 1 without using the TiCN-based cermet raw material powder.

Next, the composite sintered body cutting tools 1-6, 7-9 of the comparative example (hereinafter referred as tools 1-6, 7-9 of the comparative example) in the shape of SNMN120408, were produced by performing honing process of R=0.04 on the cutting edge as the WC-based cemented carbide being the rake face on the obtained composite sintered bodies 1-6, 7-9 of the comparative example.

Next, as in the tools 1-12 of the present invention, the component compositions of the WC-based cemented carbide layer and the TiCN-based cermet layer were obtained by: performing compositional analysis on each location from the boundary between the WC-based cemented carbide layer and the TiCN-based cermet layer to the location 100 μm to the WC-based cemented carbide layer side or to the location 100 μm to the TiCN-based cermet layer side by using an electron probe microanalyzer; and obtaining the average values on 10 measurement locations in the tools 1-6 of the comparative example.

In addition, thicknesses of the WC-based cemented carbide layer and the TiCN-based cermet layer of the tools 1-6 of the comparative example were measured by observing with an optical microscopy. Measurements were made in 5 different points; and the thickness was obtained by averaging these values.

These values are shown in Table 6.

In addition, the ratio of the maximum elevation difference with respect to the thickness of the tool was obtained by performing measurements of: the height profile of the rake face with the reference line, which is the line perpendicular to the rake face; and the maximum elevation difference from the reference line of the profile as described below. By using a stylus type surface profile measuring device, the sample was set to the device, one surface among the flank surfaces facing downward. Then, the device was set to scan the probe within the plane, which passed the center of the rake face and was perpendicular to the rake face. Then, the tip of the probe was aligned with the ridge line where the rake face and the flank face intersected each other; and the rake face was scanned to the other ridge line to obtain the height profile. On the obtained height profile, the line connecting the two ridge lines was defined as the reference line of the height zero; and the maximum elevation difference was obtained from: the point where the height from the reference line was the maximum; the point where the height from the reference line was the minimum; and the difference of the heights of these two points. The thickness of the composite sintered body cutting tool was measured by using the caliper; and the ratio of the maximum elevation difference with respect to the thickness of the tool was obtained by dividing the maximum elevation difference by the thickness of the tool.

Next, on the tools 4-9 of the comparative example, the hard coating layer made of the Ti and Al nitride (each of the Ti content and the Al content was 50 atomic %) was deposited on the surface of the WC-based cemented carbide by arc ion plating.

The layer thicknesses of the deposited hard coating layers are shown in Table 6.

TABLE 1

| | | Blending composition (mass %) | | | | | |
|---|---|---|---|---|---|---|---|
| Type | | Iron group metal Co | VC | TaC | NbC | $Cr_3C_2$ | WC |
| WC-based | A | 4 | — | 2 | 1 | — | balance |
| cemented | B | 10 | — | — | — | — | balance |
| carbide | C | 17 | 1 | — | — | 0.5 | balance |
| raw | D | 2 | — | 2 | 1 | — | balance |
| material | E | 20 | 1 | — | — | 0.5 | balance |
| powder | F | 20 | — | — | — | — | balance |

TABLE 2

| | | Blending composition (mass %) | | | | | | | | |
|---|---|---|---|---|---|---|---|---|---|---|
| Type | | Iron group metal Co | Ni | Fe | WC | ZrC | NbC | TaC | $Mo_2C$ | $Cr_3C_2$ | TiCN |
| TiCN-based | A | 14 | 5 | — | 12 | — | 5 | — | 10 | 1 | balance |
| cermet raw | B | 2 | 2 | 1 | 15 | — | 11 | — | 15 | 2 | balance |
| material | C | 20 | 5 | — | 5.5 | — | 3 | 4 | 3 | 0.3 | balance |
| powder | D | 17 | 3 | — | 30 | 2 | 3 | 4 | 2.5 | — | balance |
| | E | 1 | 2 | — | 14 | — | 13 | — | 17 | 3 | balance |
| | F | 15 | 15 | — | 15 | — | — | 4 | 1 | — | balance |

TABLE 3

| Type | | WC-based cemented carbide raw material powder | | TiCN-based cermet raw material powder | |
|---|---|---|---|---|---|
| | | Type | Thickness (mm) | Type | Thickness (mm) |
| Composite green compact of the present invention | 1 | B | 0.5 | B | 4.26 |
| | 2 | A | 0.7 | C | 4.06 |
| | 3 | C | 1.2 | A | 3.56 |
| | 4 | A | 0.8 | A | 3.96 |
| | 5 | B | 0.25 | C | 4.51 |
| | 6 | C | 1.4 | B | 3.36 |

TABLE 4

| Type | | Type of composite green compact | WC-based cemented carbide layer Component composition | | | TiCN-based cermet layer Component composition | | |
|---|---|---|---|---|---|---|---|---|
| | | | Iron group metal content (mass %) | W (mass %) | Thickness (mm) | Iron group metal content (mass %) | Co/(Co + Ni) | W (mass %) |
| Tool of the present invention | 1 | 1 | 10 | 85 | 0.5 | 4 | 0.5 | 14 |
| | 2 | 2 | 4 | 87 | 0.7 | 25 | 0.8 | 5 |
| | 3 | 3 | 17 | 77 | 1.2 | 19 | 0.7 | 11 |
| | 4 | 4 | 4 | 87 | 0.8 | 18 | 0.7 | 12 |
| | 5 | 5 | 10 | 84 | 0.25 | 24 | 0.8 | 6 |
| | 6 | 6 | 17 | 76 | 1.4 | 4 | 0.5 | 14 |

| Type | | TiCN-based cermet layer Component composition | | | (Thickness of the WC-based cemented carbide)/(Thickness of the composite sintered body) | (Maximum elevation difference in the height profile of the rake face)/(Thickness of the composite sintered body) | Thickness of the hard coating layer (μm) |
|---|---|---|---|---|---|---|---|
| | | Mo (mass %) | Nb (mass %) | Cr (mass %) | | | |
| Tool of the present invention | 1 | 15 | 10 | 1.9 | 0.11 | 0.004 | — |
| | 2 | 2 | 3 | 0.3 | 0.15 | 0.005 | — |
| | 3 | 10 | 4 | 1.0 | 0.25 | 0.008 | — |
| | 4 | 9 | 5 | 0.9 | 0.17 | 0.006 | 2 |
| | 5 | 3 | 2 | 0.2 | 0.05 | 0.003 | 2 |
| | 6 | 14 | 9 | 2.0 | 0.29 | 0.010 | 1 |

TABLE 5

| Type | | WC-based cemented carbide raw material powder | | TiCN-based cermet raw material powder | |
|---|---|---|---|---|---|
| | | Type | Thickness (mm) | Type | Thickness (mm) |
| Composite green compact of the comparative example | 1 | A | 0.5 | E | 4.26 |
| | 2 | B | 0.7 | F | 4.06 |
| | 3 | C | 1.2 | D | 3.56 |
| | 4 | D | 0.8 | B | 3.96 |
| | 5 | E | 0.25 | C | 4.51 |
| | 6 | F | 1.4 | A | 3.36 |
| | 7 | A | 4.76 | — | — |
| | 8 | B | 4.76 | — | — |
| | 9 | C | 4.76 | — | — |

TABLE 6

| | | WC-based cemented carbide layer | | | TiCN-based cermet layer | | | |
| | | Component composition | | | Component composition | | | |
| Type | | Type of composite green compact | Iron group metal content (mass %) | W (mass %) | Thickness (mm) | Iron group metal content (mass %) | Co/(Co + Ni) | W (mass %) | Mo (mass %) |
|---|---|---|---|---|---|---|---|---|---|
| Tool of the comparative example | 1 | 1 | 4 | 87 | 0.5 | 3 | 0.3 | 14 | 17 |
| | 2 | 2 | 10 | 84 | 0.7 | 30 | 0.5 | 15 | 1 |
| | 3 | 3 | 17 | 76 | 1.2 | 19 | 0.9 | 30 | 2 |
| | 4 | 4 | 2 | 89 | 0.8 | 4 | 0.5 | 15 | 14 |
| | 5 | 5 | 20 | 74 | 0.25 | 25 | 0.8 | 6 | 3 |
| | 6 | 6 | 20 | 75 | 1.4 | 18 | 0.7 | 12 | 10 |
| | 7 | 7 | 4 | 88 | 4.76 | — | — | — | — |
| | 8 | 8 | 10 | 85 | 4.76 | — | — | — | — |
| | 9 | 9 | 17 | 77 | 4.76 | — | — | — | — |

| | | TiCN-based cermet layer Component composition | | (Thickness of the WC-based cemented carbide)/(Thickness of the composite sintered body) | (Maximum elevation difference in the height profile of the rake face)/(Thickness of the composite sintered body) | Thickness of the hard coating layer (μm) |
| Type | | Nb (mass %) | Cr (mass %) | | | |
|---|---|---|---|---|---|---|
| Tool of the comparative example | 1 | 13 | 3 | 0.11 | 0.025 | — |
| | 2 | 0 | 0 | 0.15 | 0.031 | — |
| | 3 | 3 | 0 | 0.25 | 0.012 | — |
| | 4 | 10 | 2 | 0.17 | 0.015 | 2 |
| | 5 | 3 | 0.3 | 0.05 | 0.018 | 2 |
| | 6 | 5 | 1 | 0.29 | 0.017 | 2 |
| | 7 | — | — | 1 | 0.003 | 2 |
| | 8 | — | — | 1 | 0.003 | 2 |
| | 9 | — | — | 1 | 0.002 | 1 |

Next, the wear resistance and the abnormal damage resistance were evaluated on the tools 1-6 of the present invention and the tools 1-9 of the comparative example in the cutting conditions 1 and 2 described below.

[Cutting Condition 1]

Work material: Round bar with 4 longitudinal grooves formed at equal intervals in the longitudinal direction of JIS SCM440

Cutting speed: 315 m/min
Depth of cut: 1.0 mm
Feed rate: 0.15 mm/rev.
Cutting time: 10 minutes The wet intermittent cutting test of alloy steel was performed in the condition indicated above, and the wear width on the flank face; and the cutting time until they reached to their service lives were measured.

[Cutting Condition 2]

Work material: Round bar with 4 longitudinal grooves formed at equal intervals in the longitudinal direction of JIS S45C Cutting speed: 330 m/min
Depth of cut: 2.0 mm
Feed rate: 0.2 mm/rev.
Cutting time: 3 minutes The wet intermittent cutting test of carbon steel was performed in the condition indicated above, and the abnormal damage resistance was evaluated. When crack, chipping, or fracture occurred in the cutting edge, the abnormal damage was evaluated as "present"; and when there was no crack, chipping, or fracture occurred in the cutting edge, it was evaluated as "absent."

In addition, on the tools 1-6 of the present invention and the tools 1-6 of the comparative example, the reduction ratio of the usage of W (mass %) with respect to the case where the tool was made of the WC-based cemented carbide entirely without laminating the cermet based on the values of (the thickness of the WC-based cemented carbide)/(the thickness of the tool) shown in Tables 4 and 5 was calculated in each tool.

These results are shown in Table 7.

TABLE 7

| Type | | Wear width on the flank face (cutting condition 1) (mm) | Presence or absence of abnormal damage (cutting condition 2) | Reduction ratio of the usage of W (mass %) |
|---|---|---|---|---|
| Tool of the present invention | 1 | 0.13 | absence | 75 |
| | 2 | 0.15 | absence | 80 |
| | 3 | 0.17 | absence | 64 |
| | 4 | 0.10 | absence | 72 |
| | 5 | 0.08 | absence | 89 |
| | 6 | 0.12 | absence | 58 |
| Tool of the comparative example | 1 | *4.2 | present | 76 |
| | 2 | *4.4 | present | 71 |
| | 3 | *3.7 | present | 47 |
| | 4 | *2.5 | present | 70 |
| | 5 | *1.4 | present | 88 |
| | 6 | *1.6 | present | 44 |
| | 7 | 0.12 | present | 0 |
| | 8 | 0.10 | present | 0 |
| | 9 | 0.12 | present | 0 |

Asterisk marks (*) in the tool of the comparative examples indicate the cutting time (minutes) until they reached to their service lives due to occurrence of abnormal damage such as chipping or the like.

Based on the results shown in Tables 4, 6 and 7, it was demonstrated that propagation and development of the crack was suppressed by: optimizing the ranges of the component compositions of the TiCN-based cermet and the WC-based cemented carbide; and optimizing the ratio of the thickness of the WC-based cemented carbide layer constituting the rake face including the cutting edge, in the wet intermittent cutting of alloy steel or the like where intermittent and impacting high load and thermal load were exerted on the cutting edge without reducing the chipping resistance in the tools of the present invention even if the usage of tungsten was reduced. Accordingly, the tools of the present invention exhibited excellent abnormal damage resistance and wear resistance for a long-term usage, and showed cutting performance equivalent to the tools 7-9 of the comparative example which were produced from only WC-based cemented carbide (which were tools of 0% of the reduction ratios of the usage of W).

Moreover, from the viewpoint of the abnormal damage resistance, the tools 1-6 of the present invention had excellent abnormal damage resistance compared to the tools 7-9 of the comparative example.

Contrary to that, even though the usage of tungsten was reduced in the tools 1-6 of the comparative example, the crack resistance was inferior. Thus, it was clear that they would reach their service lives in a short period of time.

Example 2

In Example 1, the tool, in which the planar shape of the rake face was in the polygonal shape; and the rake face made of the WC-based cemented carbide was formed only on one surface of the TiCN-based cermet, was explained. Next, a tool, in which the rake faces are formed on both sides of the TiCN-based cermet, is explained as Example 2.

As in the case of Example 1, the WC-based cemented carbide raw material powder having the blending composition shown in Table 1 and the average grain size of 0.5 to 3 μm; and the TiCN-based cermet raw material powder having the blending composition shown in Table 2 and the average grain size of 0.5 to 3 μm, were prepared.

The above-described TiCN-based cermet raw powder was put in the state where it was sandwiched from the upper and lower side by the WC-based cemented carbide; and they were laminate-pressed in the combinations shown in Table 8 with the material dies of the ISO insert shape SNMN120408; and the composite green compacts 11-13 were produced.

The composite sintered body cutting tools 11-13 of the present invention (hereinafter referred as tools 11-13 of the present invention) in the shape of SNMN120408 were produced by performing honing process of R=0.04 on the cutting edge by sintering the composite green compacts 11-13 in the same condition as in Example 1.

Next, the hard coating layer made of the Ti and Al complex nitride (each of the Ti content and the Al content was 50 atomic %) was deposited on the surface of the WC-based cemented carbide by arc ion plating in the tool 23 of the present invention.

On the tools 11-13 of the present invention, the component compositions of the WC-based cemented carbide and the TiCN-based cermet; the thicknesses thereof; the maximum elevation difference of the height profile on the flank face from the reference plane; and the thickness of the hard coating layer, were obtained in the same method as in Example 1.

These results are shown in Tables 9 and 10.

Next, on the tools 11-13 of the present invention, the wear width on the flank face was measured by performing the wet intermittent cutting test of alloy steel in the same condition as in Example 1; and the presence and absence of the abnormal damage were confirmed by performing the wet intermittent cutting test of the carbon steel. In addition, the reduction ratio of the usage of W (mass %) with respect to the case where the tool was made of the WC-based cemented carbide entirely without laminating the cermet based on the values of (the thickness of the WC-based cemented carbide)/(the thickness of the tool) shown in Table 10 was calculated in each tool.

These results are shown in Table 10.

TABLE 8

| Type | | Planar shape of the rake face | WC-based cemented carbide raw material powder (upper surface) | | WC-based cemented carbide raw material powder (lower surface) | | TiCN-based cermet raw material powder | |
|---|---|---|---|---|---|---|---|---|
| | | | Type | Thickness (mm) | Type | Thickness (mm) | Type | Thickness (mm) |
| Composite green compact of the present invention | 11 | polygonal | A | 0.25 | A | 0.25 | B | 4.26 |
| | 12 | polygonal | B | 0.5 | B | 0.5 | A | 3.76 |
| | 13 | polygonal | C | 0.7 | C | 0.7 | C | 3.36 |

TABLE 9

| Type | | Type of composite green compact | WC-based cemented carbide layer (upper surface) Component composition | | | WC-based cemented carbide layer (lower surface) Component composition | | | TiCN-based cermet layer Component composition | | | | | |
|---|---|---|---|---|---|---|---|---|---|---|---|---|---|---|
| | | | Iron group metal content (mass %) | W (mass %) | Thickness (mm) | Iron group metal content (mass %) | W (mass %) | Thickness (mm) | Iron group metal content (mass %) | Co/ (Co + Ni) | W (mass %) | Mo (mass %) | Nb (mass %) | Cr (mass %) |
| Tool of the present invention | 11 | 11 | 4 | 87 | 0.25 | 4 | 87 | 0.25 | 4 | 0.5 | 14 | 15 | 10 | 1.8 |
| | 12 | 12 | 10 | 84 | 0.5 | 10 | 84 | 0.5 | 19 | 0.7 | 10 | 10 | 5 | 1.2 |
| | 13 | 13 | 17 | 77 | 0.7 | 17 | 77 | 0.7 | 24 | 0.8 | 6 | 2 | 2 | 0.4 |

TABLE 10

| Type | | (Thickness of the WC-based cemented carbide)/(Thickness of the composite sintered body) | (Maximum elevation difference in the height profile of the rake face)/(Thickness of the composite sintered body) | Thickness of the hard coating layer (μm) | Cutting test result | | Reduction ratio of the usage of W (mass %) |
|---|---|---|---|---|---|---|---|
| | | | | | Wear width on the flank face (cutting condition 1) (mm) | Presence or absence of the abnormal damage (cutting condition 2) | |
| Tool of the present invention | 11 | 0.11 | 0.004 | — | 0.14 | absent | 75 |
| | 12 | 0.21 | 0.005 | — | 0.11 | absent | 68 |
| | 13 | 0.29 | 0.007 | 2 | 0.09 | absent | 66 |

Example 3

Next, a tool, in which the planar shape of the rake face is in a circular shape, is explained in Example 3.

The WC-based cemented carbide raw material powder having the blending composition shown in Table 1 and the average grain size of 0.5 to 3 μm; and the TiCN-based cermet raw material powder having the blending composition shown in Table 2 and the average grain size of 0.5 to 3 μm, were prepared.

The above-described WC-based cemented carbide raw material powder and the TiCN-based cermet raw powder were laminate-pressed in the combinations shown in Table 11 with the material dies of the ISO insert shape RNMG120400; and the composite green compacts 21-24 were produced.

In addition, in the produced composite green compacts 23 and 24, the TiCN-based cermet raw material powder was put in the state where it was sandwiched from the upper and lower side by the WC-based cemented carbide powder.

Next, the composite sintered bodies 21-24 were produced by sintering the composite green compacts 21-24.

The sintering condition was the same as in Example 1.

The composite sintered body cutting tools 21-24 of the present invention (hereinafter referred as tools 21-24 of the present invention) having the planar shape of the rake face in a circular shape were produced by performing honing process of R=0.04 on the cutting edge on the obtained composite sintered bodies 21-24.

Next, the hard coating layer made of the Ti and Al complex nitride (each of the Ti content and the Al content was 50 atomic %) was deposited on the surface of the WC-based cemented carbide by arc ion plating in the tools 22, and 24 of the present invention.

On the tools 21-24 of the present invention, the component compositions of the WC-based cemented carbide and the TiCN-based cermet; the thicknesses thereof; the maximum elevation difference of the height profile on the flank face from the reference plane; and the thickness of the hard coating layer, were obtained in the same method as in Example 1.

These results are shown in Tables 12 and 13.

Next, on the tools 21-24 of the present invention, the wear width on the flank face was measured by performing the wet intermittent cutting test of alloy steel in the same condition as in Example 1; and the presence and absence of the abnormal damage were confirmed by performing the wet intermittent cutting test of the carbon steel. In addition, the reduction ratio of the usage of W (mass %) with respect to the case where the tool was made of the WC-based cemented carbide entirely without laminating the cermet based on the values of (the thickness of the WC-based cemented carbide)/ (the thickness of the tool) shown in Table 13 was calculated in each tool.

These results are shown in Table 13.

TABLE 11

| | Planar shape of the rake face | WC-based cemented carbide raw material powder (upper surface) | | WC-based cemented carbide raw material powder (lower surface) | | TiCN-based cermet raw material powder | |
|---|---|---|---|---|---|---|---|
| Type | | Type | Thickness (mm) | Type | Thickness (mm) | Type | Thickness (mm) |
| Composite green compact of the present invention | 21 circular | A | 0.5 | — | — | A | 4.26 |
| | 22 circular | B | 1.0 | — | — | B | 3.76 |
| | 23 circular | B | 0.5 | B | 0.5 | C | 3.76 |
| | 24 circular | C | 0.7 | C | 0.7 | A | 3.36 |

TABLE 12

| | | WC-based cemented carbide layer (upper surface) | | | WC-based cemented carbide layer (lower surface) | | | TiCN-based cermet layer | | | | | |
|---|---|---|---|---|---|---|---|---|---|---|---|---|---|
| | | Component composition | | | Component composition | | | Component composition | | | | | |
| Type | Type of composite green compact | Iron group metal content (mass %) | W (mass %) | Thickness (mm) | Iron group metal content (mass %) | W (mass %) | Thickness (mm) | Iron group metal content (mass %) | Co/(Co + Ni) | W (mass %) | Mo (mass %) | Nb (mass %) | Cr (mass %) |
| Tool of the present invention | 21 | 21 | 4 | 87 | 0.5 | — | | | 18 | 0.7 | 9 | 10 | 5 | 0.3 |
| | 22 | 22 | 9 | 84 | 1.0 | — | | | 4 | 0.5 | 15 | 14 | 10 | 1.9 |
| | 23 | 23 | 10 | 85 | 0.5 | 10 | 85 | 0.5 | 5 | 0.8 | 14 | 15 | 9 | 1.8 |
| | 24 | 24 | 16 | 76 | 0.7 | 16 | 76 | 0.7 | 24 | 0.7 | 6 | 2 | 2 | 0.3 |

TABLE 13

| | | | | Cutting test result | | |
|---|---|---|---|---|---|---|
| Type | | (Thickness of the WC-based cemented carbide)/(Thickness of the composite sintered body) | (Maximum elevation difference in the height profile of the rake face)/(Thickness of the composite sintered body) | Thickness of the hard coating layer (μm) | Wear width on the flank face (cutting condition 1) (mm) | Presence or absence of the abnormal damage (cutting condition 2) | Reduction ratio of the usage of W (mass %) |
| Tool of the present invention | 21 | 0.11 | 0.008 | — | 0.14 | absent | 78 |
| | 22 | 0.21 | 0.009 | 2 | 0.12 | absent | 66 |
| | 23 | 0.21 | 0.006 | — | 0.15 | absent | 74 |
| | 24 | 0.29 | 0.007 | 2 | 0.13 | absent | 60 |

Based on Table 10 showing the results of Example 2 and Table 13 showing the results of Example 3, it was demonstrated that the tools 11-13 and 21-24 of the present invention exhibited excellent abnormal damage resistance and wear resistance for a long-term usage in the wet intermittent cutting of alloy steel or the like where the intermittent and impacting high load and the thermal load were exerted on the cutting edge. At the same time, reduction of the usage of W was achieved.

In addition, as in Example 1, from the viewpoint of the abnormal damage resistance, the tools 11-13 and 21-24 of the present invention had excellent abnormal damage resistance compared to the tools 7-9 of the comparative example.

INDUSTRIAL APPLICABILITY

According to the cutting tool of the present invention with the tool body of the composite sintered body, the usage of tungsten which is a rare metal can be reduced. In addition, it has excellent thermal crack resistance even if it is used in the wet intermittent cutting where the intermittent and impacting high load and the thermal load are exerted on the cutting edge, and can exhibits excellent cutting performance for a long-term usage without causing abnormal damages such as chipping, fracture, peeling and the like. Thus, it is applicable for satisfying energy saving and reducing costs in cutting sufficiently.

REFERENCE SIGNS LIST

1: Composite sintered body cutting tool
2: TiCN-based cermet layer
3: WC-based cemented carbide layer
4: Rake face
5: Flank face
6: Composite sintered body cutting tool with a planar shape of a polygonal shape
7: Composite sintered body cutting tool with a planar shape of a circular shape
8: Hard coating layer
9: Reference plane
10: Maximum elevation difference

The invention claimed is:

1. A composite sintered body cutting tool made of a composite sintered body comprising:
   a TiCN cermet layer; and
   a WC cemented carbide layer, wherein
   (a) an angle between a rake face and a flank face of the cutting tool is 90°,
   (b) the rake face including a cutting edge of the cutting tool is constituted from the WC cemented carbide layer comprising: a total amount of 4 to 17 mass % of one or more of Co, Ni and Fe; 75 mass % or more of W; and a major hard phase component of WC,
   (c) a thickness of the WC cemented carbide layer is 0.05 to 0.3 times a thickness of the composite sintered body,
   (d) the TiCN cermet layer is constituted from a single layer of a TiCN cermet layer, comprising: 2 to 20 mass % of Co; 2 to 5 mass % of Ni; less than 15 mass % of W; 2 to 15 mass % of Mo; 2 to 10 mass % of Nb; 0.2 to 2 mass % of Cr; and TiCN balance, a total amount of Co and Ni being in a range of 4 to 25 mass %, a Co content relative to a total content of Co and Ni in a mass ratio being in a range of 0.5 to 0.8, and
   (e) when a height profile from an upper end to a lower end of the flank face is measured in a plane, which passes a center of the rake face of the cutting tool and is perpendicular to both of the rake face and the flank face, as a line, which passes a ridge line where the rake face and the flank face intersect and perpendicular to the rake face, being a reference line, a maximum elevation difference value of the height profile is in a ratio of 0.01 or less with respect to a thickness of the composite sintered body from a front surface of the rake face to a rear surface.

2. The composite sintered body cutting tool according to claim 1, wherein a planar shape of the rake face is in a polygonal shape or a circular shape.

3. The composite sintered body cutting tool according to claim 1, wherein the WC cemented carbide layer constituting the rake face of the composite sintered body cutting tool is formed on: a front surface of the TiCN cermet layer; or a front surface and a rear surface of the TiCN cermet layer.

4. A surface coated composite sintered body cutting tool comprising:
   the composite sintered body cutting tool according to claim 1; and
   a hard coating layer formed on the front surface of the WC cemented carbide layer constituting at least the rake face of the composite sintered body cutting tool comprising the TiCN cermet layer and the WC cemented carbide layer.

5. The composite sintered body cutting tool according to claim 1, wherein the WC cemented carbide layer comprises at least Co.

6. The composite sintered body cutting tool according to claim 1, wherein the maximum elevation difference value of the height profile is in a ratio of 0.004 or more and 0.01 or less.

* * * * *